United States Patent
Jeong et al.

(10) Patent No.: US 11,040,384 B2
(45) Date of Patent: Jun. 22, 2021

(54) SYSTEM AND METHOD FOR MANUFACTURING ELECTRODE FOR SECONDARY BATTERY

(71) Applicant: LG Chem, Ltd., Seoul (KR)

(72) Inventors: An Soo Jeong, Daejeon (KR); Pil Kyu Park, Daejeon (KR); Han Gab Song, Daejeon (KR); Duck Joong Yun, Daejeon (KR); Dae Hyun Kim, Daejeon (KR); Nam Won Kim, Daejeon (KR)

(73) Assignee: LG Chem, Ltd.

( * ) Notice: Subject to any disclaimer, the term of this patent is extended or adjusted under 35 U.S.C. 154(b) by 107 days.

(21) Appl. No.: 16/325,318

(22) PCT Filed: Jul. 3, 2018

(86) PCT No.: PCT/KR2018/007528
§ 371 (c)(1),
(2) Date: Feb. 13, 2019

(87) PCT Pub. No.: WO2019/017619
PCT Pub. Date: Jan. 24, 2019

(65) Prior Publication Data
US 2019/0201952 A1    Jul. 4, 2019

(30) Foreign Application Priority Data

Jul. 20, 2017 (KR) .................. 10-2017-0092288

(51) Int. Cl.
*E21B 1/30* (2006.01)
*B21B 1/30* (2006.01)
(Continued)

(52) U.S. Cl.
CPC ............. *B21B 1/30* (2013.01); *B21B 37/16* (2013.01); *B21B 38/08* (2013.01); *G01J 1/02* (2013.01);
(Continued)

(58) Field of Classification Search
CPC ........... B21B 1/30; B21B 37/16; B21B 38/08; B21B 28/00; B21B 28/02; B21B 38/00;
(Continued)

(56) References Cited

U.S. PATENT DOCUMENTS 5,048,326 A * 9/1991 Toida ................... G01B 5/0002
73/105
5,331,178 A * 7/1994 Fukuda ................... B21B 27/10
250/239
(Continued)

FOREIGN PATENT DOCUMENTS

CN    105190500 A    12/2015
JP    H11281307 A    10/1999
(Continued)

OTHER PUBLICATIONS

"Quick Guide To Surface Roughness Treatment." Bulletin No. 2229, Mitutoyo America Corporation, Dec. 2016, available at https://www.mitutoyo.com/wp-content/uploads/2012/11/1984_Surf_Roughness_PG.pdf (Year: 2016).*
(Continued)

*Primary Examiner* — Michael L Dignan
(74) *Attorney, Agent, or Firm* — Lerner, David, Littenberg, Krumholz & Mentlik, LLP

(57) ABSTRACT

The present invention relates to a system for manufacturing an electrode for a secondary battery. The system for manufacturing the electrode for the secondary battery comprises a supply roller supplying a collector having a long sheet shape; an electrode active material coating device applying
(Continued)

an electrode active material to a surface of the collector supplied by the supply roller to manufacture an unfinished electrode; a rolling roller rolling a surface of the unfinished electrode and adjusting a thickness of the electrode active material to manufacture a finished electrode; and an electrode quality inspection device inspecting quality of the electrode through a surface roughness value of the rolling roller and a surface roughness value of the electrode.

3 Claims, 6 Drawing Sheets

(51) Int. Cl.
  *B21B 37/16*   (2006.01)
  *B21B 38/08*   (2006.01)
  *G01J 1/02*    (2006.01)
  *H01M 4/04*    (2006.01)
  *H01M 4/88*    (2006.01)
(52) U.S. Cl.
  CPC ....... *H01M 4/0404* (2013.01); *H01M 4/0435* (2013.01); *H01M 4/8896* (2013.01)
(58) Field of Classification Search
  CPC ... B21B 38/02; H01M 4/0404; H01M 4/8896; H01M 4/0435; G01J 1/02
  See application file for complete search history.

(56) References Cited

U.S. PATENT DOCUMENTS

| | | | |
|---|---|---|---|
| 5,346,385 A | 9/1994 | McAleavey | |
| 6,625,515 B2* | 9/2003 | Kerr | G01N 33/20 |
| | | | 700/148 |
| 2004/0244455 A1* | 12/2004 | Eschner | B21B 28/04 |
| | | | 72/236 |
| 2006/0236511 A1* | 10/2006 | Tiepelmann | B21B 38/00 |
| | | | 29/17.2 |
| 2011/0052954 A1* | 3/2011 | Fujiwara | H01M 4/0404 |
| | | | 429/94 |
| 2012/0231353 A1 | 9/2012 | Bulan et al. | |
| 2012/0246917 A1 | 10/2012 | Dairen et al. | |
| 2015/0017510 A1 | 1/2015 | Terado | |
| 2015/0318539 A1 | 11/2015 | Kelley et al. | |
| 2016/0124575 A1 | 5/2016 | Yashiro et al. | |
| 2016/0346821 A1* | 12/2016 | Winchip | B24B 55/02 |
| 2017/0288208 A1 | 10/2017 | Kelley et al. | |
| 2017/0373338 A1 | 12/2017 | Teranishi et al. | |

FOREIGN PATENT DOCUMENTS

| | | |
|---|---|---|
| JP | 2000080406 A | 3/2000 |
| JP | 2015041515 A | 3/2015 |
| JP | 6071219 B2 | 2/2017 |
| JP | 2017515277 A | 6/2017 |
| KR | 20020055725 A | 7/2002 |
| KR | 100958649 B1 | 5/2010 |
| KR | 20140121457 A | 10/2014 |
| KR | 20150031257 A | 3/2015 |
| KR | 20150037330 A | 4/2015 |
| KR | 20150080745 A | 7/2015 |
| KR | 20150141412 A | 12/2015 |
| KR | 20170030174 A | 3/2017 |
| WO | 2016104782 A1 | 6/2016 |

OTHER PUBLICATIONS

Machine English translation of KR 2015-0141412 to LG Chem (Year: 2015).*
International Search Report for PCT/KR2018/007528 dated Oct. 2, 2018.
Extended European Search Report including the Written Opinion for Application No. EP18836018.4 dated Jun. 27, 2019, 9 pages.

* cited by examiner

| SURFACE ROUGHNESS OF ELECTRODE(um) | | |
|---|---|---|
| ELECTRODE | ROLL ROUGHNESS 1.0um | ROLL ROUGHNESS 0.4um |
| 1 | 0.77 | 0.44 |
| 2 | 0.65 | 0.46 |
| 3 | 0.69 | 0.43 |
| 4 | 0.57 | 0.47 |
| 5 | 0.62 | 0.43 |
| MEAN VALUE | 0.66 | 0.45 |

FIG.3

SYSTEM AND METHOD FOR MANUFACTURING ELECTRODE FOR SECONDARY BATTERY

CROSS-REFERENCE TO RELATED APPLICATION

The present application is a national phase entry under 35 U.S.C. § 371 of International Application No. PCT/KR2018/007528, filed Jul. 3, 2018, which claims priority of Korean Patent Application No. 10-2017-0092288, filed on Jul. 20, 2017, all of which are hereby incorporated by reference.

TECHNICAL FIELD

The present invention relates to a system and method for manufacturing an electrode for a secondary battery, and more particularly, to a system and method manufacturing an electrode for a secondary battery, which inspect quality of the electrode through surface roughness of a rolling roller and surface roughness of the electrode.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

Each of the electrodes comprise a collector and an electrode active material applied to a surface of the collector. The method for manufacturing the electrode comprises a step of supplying a collector, a step of applying an electrode active material to a surface of the collector to manufacture an electrode, and a step of rolling the manufactured electrode by using a rolling roller to manufacture a finished electrode.

However, in the method for manufacturing the electrode, as the rolling process of the electrode is repeated, surface roughness of the rolling roller gradually increases. When the electrode is rolled by using the rolling roller of which the surface roughness increases, surface roughness of the electrode may be deteriorated to continuously produce abnormal electrodes.

DISCLOSURE OF THE INVENTION

Technical Problem

The present invention has been made to solve the above-described problems, and an object of the present invention is to provide a system and method for manufacturing an electrode for a secondary battery, in which quality of the electrode is inspected through surface roughness of a rolling roller for rolling the electrode and surface roughness of the rolled electrode to manufacture a high-quality electrode and in particularly to prevent an abnormal electrode from being manufactured.

Technical Solution

To achieve the above-described object, a system for manufacturing an electrode for a secondary battery according to an embodiment of the present invention comprises: a supply roller supplying a collector having a long sheet shape; an electrode active material coating device applying an electrode active material to a surface of the collector supplied by the supply roller to manufacture an unfinished electrode; a rolling roller rolling a surface of the unfinished electrode and adjusting a thickness of the electrode active material to manufacture a finished electrode; and an electrode quality inspection device comprising a rolling roller measuring unit measuring surface roughness of the rolling roller, an electrode measuring unit measuring surface roughness of the electrode active material applied to the finished electrode, and an inspection unit performing first inspection for determining whether the surface roughness value of the rolling roller, which is measured by the rolling roller measuring unit, is within a range of an inputted surface roughness value of the rolling roller and performing second inspection for determining whether a surface roughness value of the finished electrode, which is measured by the electrode measuring unit, is within a range of an inputted surface roughness of the electrode.

The electrode quality inspection device may determine the finished electrode as a normal product when all of the results are determined as being normal through the first and second inspection, determine the finished electrode as a product to be re-inspected when one result is determined as being normal, and the other result is determined as being abnormal through the first and second inspection, and determine the finished electrode as an abnormal product when all of the results are determined as being abnormal through the first and second inspection.

The electrode quality inspection device may have an inspection period in which the surface roughness of the rolling roller and the electrode are inspected at intervals of 2 weeks to 4 weeks.

The electrode quality inspection device may re-inspect the surface roughness of the rolling roller or the electrode, which is determined as being abnormal, when one result is determined as being normal, and the other result is determined as being abnormal through the first and second inspection.

The electrode quality inspection device may stop an operation of the rolling roller when the surface roughness of the rolling roller or the electrode, which is determined as being abnormal, is determined as being abnormal even after the re-inspection.

The electrode quality inspection device may change the inspection period of 2 weeks to 4 weeks into an inspection period of 2 days to 7 days when the surface roughness of the rolling roller or the electrode, which is determined as being abnormal, is determined as being normal through the re-inspection.

The electrode quality inspection device may stop an operation of the rolling roller when all of the results are determined as being abnormal through the first and third inspection.

The rolling roller measuring unit may comprise a roughness tester measuring the surface roughness while contacting the surface of the rolling roller, and in the roughness tester, a tip having a needle shape, which is attached to one surface, may measure roughness while moving from a surface of one end to a surface of the other end of the rolling roller and calculate a mean value of a maximum mountain height and a minimum mountain height within a moving distance to calculate the surface roughness value of the rolling roller.

The roughness tester may measure the surface roughness at at least four spots in a circumferential direction of the rolling roller.

The inputted surface roughness value of the rolling roller may be 0.5 µm or less, and particularly, the inputted surface roughness value of the rolling roller may be 0.4 µm or less.

The electrode measuring unit may comprise an optical measuring part measuring surface roughness while enlarging and photographing the surface of the finished electrode, and the optical measuring part may enlarge and photograph the surface of the finished electrode while moving from one end to the other end in a width direction of the finished electrode and calculate a maximum mountain height and a minimum mountain height within the moving distance to calculate the surface roughness value of the finished electrode.

The inputted surface roughness value of the rolling roller may be 3 µm or less, and particularly, the inputted surface roughness value of the rolling roller may be 2 µm or less.

A method for manufacturing an electrode for a secondary battery according to an embodiment of the present invention comprises: a supply step (S10) of supplying a collector having a long sheet shape; an electrode active material coating step (S20) of applying an electrode active material to a surface of the collector to manufacture an unfinished electrode; an electrode manufacturing step (S30) of rolling a surface of the unfinished electrode by using a rolling roller and adjusting a thickness of the electrode active material to manufacture a finished electrode; and an electrode quality inspection step (S40) comprising a first process (S41) of measuring a surface roughness value of the rolling roller, a second process (S42) of measuring a surface roughness value of the electrode active material applied to the finished electrode, a third process (S43) of performing first inspection to determine whether the measured surface roughness value of the rolling roller is within a range of the inputted surface roughness value of the rolling roller, and a fourth process (S44) of performing second inspection to determine whether the measured surface roughness value of the finished electrode is within a range of the inputted surface roughness value of the electrode.

Advantageous Effects

The present invention has effects as follows.

First: The system for manufacturing the electrode for the secondary battery of the present invention may comprise the rolling roller measuring unit measuring the surface roughness of the rolling roller, the electrode measuring unit measuring the surface roughness of the electrode active material applied to the electrode, and the electrode quality inspection device inspecting the quality of the electrode through the surface roughness values measured by the rolling roller measuring unit and the electrode measuring unit. Due to the above-described feature, the high-quality electrode may be manufactured, and particularly, the manufacture of the abnormal electrode may be previously prevented to reduce the fraction defective.

Second: In the system for manufacturing the electrode for the secondary battery, if all of the surface roughness of the rolling roller and the surface roughness of the electrode active material are normal, it may be determined as the normal product. If anyone is abnormal, it may be determined as a re-inspection product, and if all of them are abnormal, it may be determined as the abnormal product. Due to the above-described feature, the electrode may be more finely divided according to the quality thereof, and in particular, the quality inspection of the electrode may be improved in accuracy.

Third: The system for manufacturing the electrode for the secondary battery may have the inspection period to inspect the surface roughness and the rolling roller and the surface roughness of the electrode at intervals of 2 weeks to 4 weeks. Due to the above-described features, the quality inspection of the electrode may be stably performed within the range that does not significantly deteriorate the productivity of the electrode.

Fourth: In the system for manufacturing the electrode for the secondary battery, if the electrode is determined as the product to be re-inspected, the surface roughness of the rolling roller or the surface roughness of the electrode, which are inspected as being abnormal, may be re-inspected. Due to the above-described feature, the accuracy with respect to the quality inspection of the electrode may be significantly improved.

Fifth: In the system for manufacturing the electrode for the secondary battery, if the surface roughness of the rolling roller and the surface roughness of the electrode are inspected as being normal after the re-inspection, the inspection period may be reduced to 2 days to 7 days to inspect to the surface roughness of the rolling roller and the surface roughness of the electrode. Thus, the timing of occurrence of the abnormal electrode may be more precisely and quickly confirmed.

Sixth: In the system for manufacturing the electrode for the secondary battery, if all of the surface roughness of the rolling roller and the surface roughness of the electrode are determined as being abnormal, the operation of the rolling roller may be stopped. Due to the above-described feature, the abnormal electrodes may be prevented from being produced. Particularly, the replacement period of the rolling roller may be easily predicted through the quality inspection for the electrode, and thus, the rolling roller that is determined as being abnormal may be replaced and mounted to perform the process of manufacturing the electrode again.

Seventh: The system for manufacturing the electrode for the secondary battery according to the present invention may inspect the surface roughness of the rolling roller through the roughness tester. Due to the above-described feature, the surface roughness value of the rolling roller may be more precisely inspected.

Eighth: The system for manufacturing the electrode for the secondary battery according to the present invention may inspect the surface roughness value of the electrode active material unit applied to the electrode through the optical measuring part. Due to the above-described feature, the surface roughness value of the electrode active material unit may be more precisely inspected.

BRIEF DESCRIPTION OF THE DRAWINGS

FIG. 3 is an inspection chart illustrating results obtained through the system for manufacturing the electrode for the secondary battery according to an embodiment of the present invention.

FIG. 4 is a view illustrating a first experimental example showing a measurement state of surface roughness of the electrode according to an embodiment of the present invention, wherein

FIG. 5 is a view illustrating a second experimental example showing a measurement state of surface roughness of the electrode according to an embodiment of the present invention, wherein

MODE FOR CARRYING OUT THE INVENTION

Figure 1:
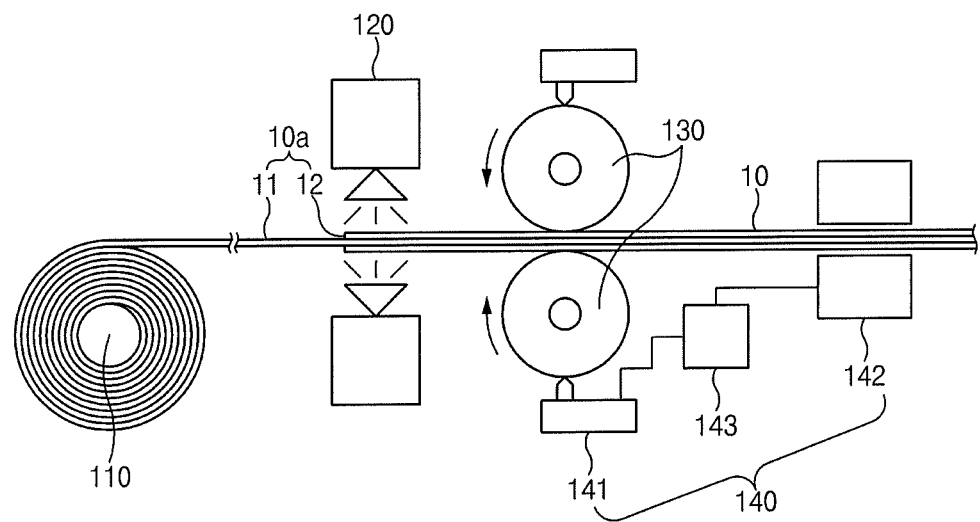
FIG. 1 is a view of a system for manufacturing an electrode for a secondary battery according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[System for Manufacturing Electrode for Secondary Battery According to Embodiment]

As illustrated in FIG. 1, a system for manufacturing an electrode for a secondary battery according to an embodiment of the present invention comprises a supply roller 110 supplying a collector 11 having a long sheet shape, an electrode active material coating device 120 applying an electrode active material 12 to a surface of the collector 11 supplied by the supply roller 110 to manufacture an unfinished electrode 10a, a rolling roller 130 rolling a surface of the unfinished electrode 10a and adjusting a thickness of the electrode active material 12 to manufacture a finished electrode 10, and an electrode quality inspection device 140 inspecting quality of the finished electrode 10 through surface roughness of the rolling roller 130 and surface roughness of the finished electrode 10 passing through the rolling roller 130.

The collector 11 having the long sheet shape is wound around the supply roller 110. When the supply roller 110 rotates, the wound collector 11 having the long sheet shape is supplied to the electrode active material coating device 120.

The electrode active material coating device 120 comprises a storage unit in which the electrode active material 12 is stored and an injection nozzle injecting the electrode active material 12 stored in the storage unit into a surface of the collector 11. That is, the electrode active material coating device 120 may apply the electrode active material 12 onto the surface of the collector 11 to manufacture the unfinished electrode 10a.

The rolling roller 130 may be provided in a pair to roll top and bottom surfaces of the unfinished electrode 10a at the same time and adjust a thickness of the electrode active material 12 of the unfinished electrode 10a, thereby manufacturing the finished electrode 10.

The surface roughness on the surface of the rolling roller 130 may be significantly deteriorated by stretches occurring while rolling the unfinished electrode 10a. When the unfinished electrode 10a is rolled by using the rolling roller 130 of which the surface roughness is deteriorated, the surface roughness of the unfinished electrode 10a may be significantly deteriorated to deteriorate battery performance and thereby to produce an abnormal electrode.

To solve above problems, the present invention comprises the electrode quality inspection device 140 for performing quality inspection of the electrode through the surface roughness of the rolling roller 130 and the surface roughness of the finished electrode 10. Particularly, the electrode quality inspection device 140 may inspect the quality of the finished electrode 10 and also accurately inform a replacement time of the rolling roller 130 of which the surface roughness is deteriorated.

That is, the electrode quality inspection device 140 comprises a rolling roller measuring unit 141 measuring the surface roughness of the rolling roller 130, an electrode measuring unit 142 measuring the surface roughness of the electrode active material 12 applied to the finished electrode 10, and an inspection unit 143 inspecting quality of the finished electrode 10 on the basis of a surface roughness value Rz of the rolling roller 130, which is measured by the rolling roller measuring unit 141 and a surface roughness value Rz of the electrode 10, which is measured by the electrode measuring unit 142.

Figure 2:
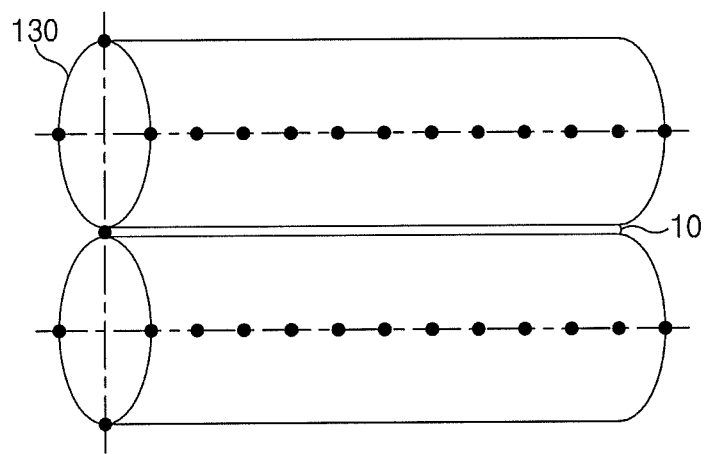
FIG. 2 is a perspective view illustrating a rolling roller measuring portion of a device for inspecting quality of the electrode according to an embodiment of the present invention.

Referring to FIGS. 1 and 2, the rolling roller measuring unit 141 comprises a roughness tester measuring the surface roughness while contacting the surface of the rolling roller 130. In the roughness tester, a tip having a needle shape, which is attached to one surface, measures roughness while moving from a surface of one end to a surface of the other end of the rolling roller 130 and then calculates a mean value of a maximum mountain height and a minimum mountain height within the moving distance and thereby to calculate the surface roughness value Rz of the rolling roller 130.

For example, as illustrated in FIG. 2, the roughness tester measures roughness while moving along points indicated in a longitudinal direction of the rolling roller 130 and calculates a mean value of the measured roughness values, thereby calculating the surface roughness value Rz of the rolling roller 130.

Particularly, the roughness tester may measure surface roughness at at least four spots in a circumferential direction of the rolling roller 130 and calculate a mean value of the surface roughness, which are measured at the at least four spots, to calculate a surface roughness value Rz of the rolling roller 130, thereby more precisely calculating the surface roughness value Rz of the rolling roller 130.

The electrode measuring unit 142 comprises an optical measuring part measuring surface roughness while enlarging and photographing a surface of the finished electrode 10. The optical measuring part may enlarge and photograph the surface of the finished electrode 10 while moving from one end to the other end in a width direction of the finished electrode 10 and then calculate a maximum mountain height and a minimum mountain height within the moving distance to calculate the surface roughness value Rz of the electrode 10. Particularly, the roughness tester may measure surface roughness at at least four spots in a circumferential direction of the finished electrode 10 and calculate a mean value of the surface roughness, which are measured at the at least four spots, to calculate a surface roughness value Rz of the finished electrode 10, thereby more precisely calculating the surface roughness value Rz of the finished electrode 10.

For example, as illustrated in FIGS. 4 and 5, the optical measuring part enlarges and photographs the surface of the finished electrode 10. Also, the optical measuring part moves from one side to the other side of the enlarged and photographed picture. Here, the heights of the mountains within the moving distance are displayed in a waveform on a monitor. Here, the surface roughness value Rz of the rolling roller, which is measured by the rolling roller measuring unit 141 may be displayed on the monitor, and the surface roughness value Rz of the finished electrode 10, which is measured by the optical measuring part, which is disposed below the rolling roller measuring unit 141. Thus, the surface roughness of the rolling roller 130 and the finished electrode 10 may be confirmed at once.

First Experimental Example

Figure 4A:
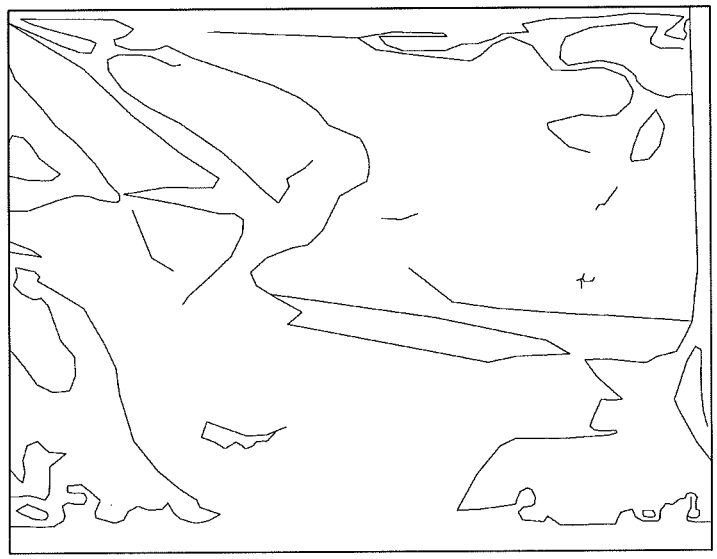
FIG. 4A is a photograph of the surface roughness of the electrode.
Figure 4B:
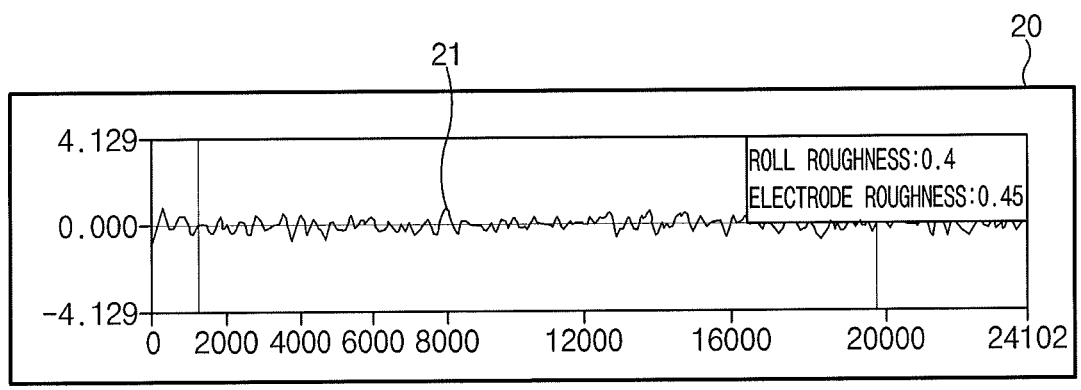
FIG. 4B is a graph of a surface roughness value of the electrode.

As a first experimental example, referring to FIG. 4, the electrode measuring unit 142 displays 0.4 μm that is a surface roughness value Rz of the rolling roller, which is measured by the rolling roller measuring unit 141, on a monitor 20 (see FIG. 4B). Next, the electrode measuring unit 142 enlarges and photographs a surface of the finished electrode 10 (see FIG. 4A). Next, the electrode measuring unit 142 displays a mountain height (or roughness) on the monitor 20 in a waveform 21 while moving from one side to the other side of the enlarged and photographed picture, and a mean value of a maximum height and a minimum height of the displayed waveform is calculated to calculate the surface roughness value Rz of the finished electrode 10. Here, referring to the waveform of FIG. 4, the surface roughness value Rz of the finished electrode 10 is calculated to 0.45 μm, and 0.45 μm that is the calculated surface roughness value Rz of the finished electrode 10 is displayed on the monitor 20.

Thus, when the unfinished electrode 10a is rolled by using the rolling roller 130 having a surface roughness value Rz of 0.4 μm, the finished electrode having 0.45 μm of the surface roughness value Rz may be manufactured.

Second Experimental Example

Figure 5A:
FIG. 5A is a photograph of the surface roughness of the electrode.
Figure 5B:
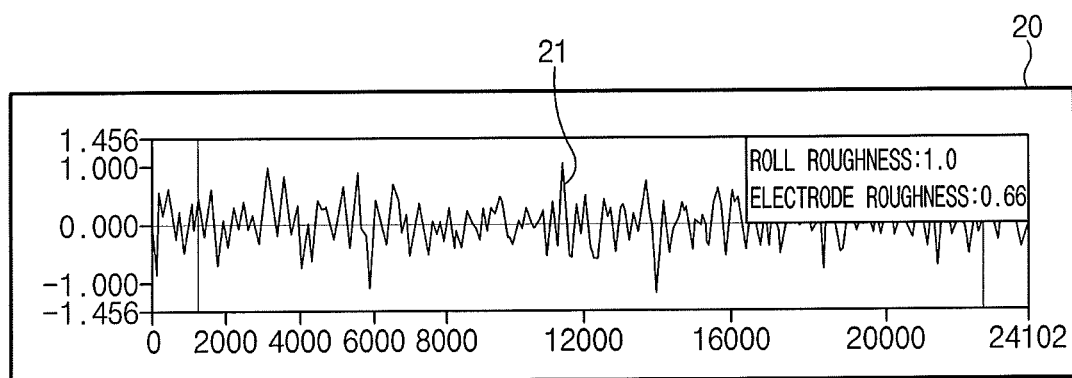
FIG. 5B is a graph of a surface roughness value of the electrode.
Figure 6:
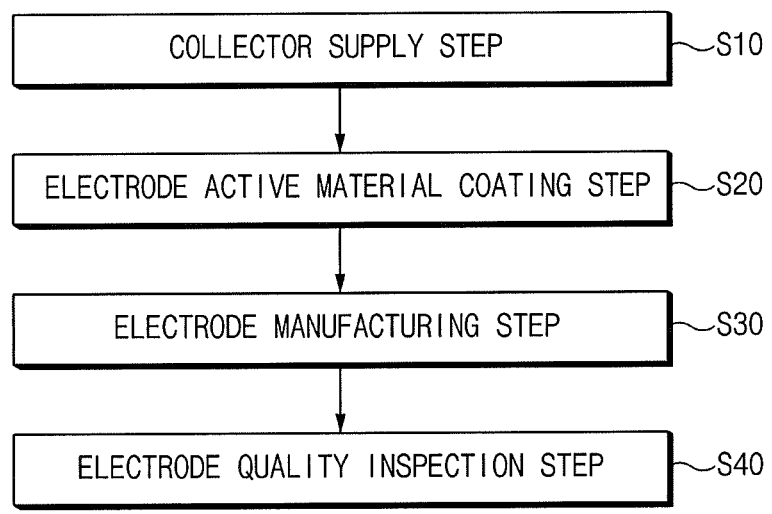
FIG. 6 is a flowchart illustrating a method for manufacturing an electrode for a secondary battery according to an embodiment of the present invention.

As a second experimental example, referring to FIG. 5, the electrode measuring unit 142 displays 1.0 μm that is a surface roughness value Rz of the rolling roller, which is measured by the rolling roller measuring unit 141, on a monitor 20 (see FIG. 5B). Next, the electrode measuring unit 142 enlarges and photographs a surface of the finished electrode 10 (see FIG. 5A). Next, the electrode measuring unit 142 displays a mountain height (or roughness) on the monitor 20 in a waveform 21 while moving from one side to the other side of the enlarged and photographed picture, and a mean value of a maximum height and a minimum height of the displayed waveform is calculated to calculate 0.66 μm that is a surface roughness value Rz of the finished electrode 10. Then, 0.66 μm that is the calculated surface roughness value Rz of the finished electrode 10 is displayed on the monitor 20.

Thus, when the unfinished electrode 10a is rolled by using the rolling roller 130 having a surface roughness value Rz of 1.0 μm, the finished electrode having 0.66 μm of the surface roughness value Rz may be manufactured.

Third Experimental Example

As a third experimental example, the first experimental example and the second experimental example are performed on five unfinished electrodes 10a, and the results may be summarized as shown in the table of FIG. 3. That is, a mean surface roughness value of the rolling roller 130 and a mean surface roughness value Rz of the finished electrode 10 may be calculated, and a quality inspection of the finished electrode 10 and whether or not the rolling roller is replaced may be inspected through the mean surface roughness value Rz of the rolling roller 130 and the mean surface roughness value Rz of the finished electrode 10.

The inspection unit 143 performs first inspection on the basis of the surface roughness value Rz of the rolling roller 130, which is calculated by the rolling roller measuring unit 141, and performs second inspection on the basis of the surface roughness valve Rz of the finished electrode 10, which is calculated by the electrode measuring unit 143 to precisely inspect the quality of the finished electrode 10.

For example, the inspection unit 143 performs first inspection for determining whether the surface roughness value Rz of the rolling roller 130, which is measured by the rolling roller measuring unit 141, is within a range of the inputted surface roughness value Rz of the rolling roller, and performs second inspection for determining whether the surface roughness value Rz of the finished electrode 10, which is measured by the electrode measuring unit 142, is within a range of the inputted surface roughness of the electrode.

That is, the inspection unit 143 determines the finished electrode 10 as the normal product when all of the results are determined as being normal through the first and second inspection, determines the finished electrode 10 as the product to be re-inspected when one result is determined as being normal, and the other result is determined as being abnormal through the first and second inspection, and determines the finished electrode 10 as the abnormal product when all of the results are determined as being abnormal through the first and second inspection.

Here, the inspection unit 143 recognizes that there is no problem in the surface roughness of the rolling roller 130 and the surface roughness of the finished electrode 10 when the finished electrode 10 is determined as the normal product. Thus, the inspection period of the surface roughness of the rolling roller 130 and the surface roughness of the finished electrode 10 may be set long to improve efficiency of the work. For example, the inspection unit 143 has an inspection period for inspecting the surface roughness of the rolling roller 130 and the electrode 10 at intervals of 2 weeks to 4 weeks.

The inspection unit 143 re-inspects the surface roughness of the rolling roller 130 or the surface roughness of the finished electrode 10 when one result is determined as being normal, and the other result is determined as being abnormal through the first and second inspection. For example, the inspection unit 143 may determine that a measurement error occurs when the result is determined as being abnormal through the first inspection and the result is determined as being normal through the second inspection, or when the result is determined as being normal through the first inspection, and the result is determined as being abnormal through the second inspection. Thus, the surface roughness of the rolling roller 130 or the surface roughness of the finished electrode 10, which is determined as being abnormal, may be re-inspected to minimize an occurrence of errors and improve accuracy of the inspection.

Here the inspection unit stops the operation of the rolling roller 130 so that the abnormal electrode is not continuously manufactured when the surface roughness of the rolling roller 130 or the surface roughness of the finished electrode 10, which is determined as being abnormal, is determined as being abnormal even after the re-inspection. Also, the abnormal rolling roller may be replaced with a new rolling roller to perform the electrode manufacturing process again. Here, the replacement period of the rolling roller may be easily confirmed.

When the surface roughness of the rolling roller or the surface roughness of the electrode, which is determined as being abnormal, is determined as normal after the re-inspection, the finished electrode 10 that is determined as the re-inspected product may be determined as the normal product. Also, possibility of reoccurrence of the defects due to the abnormal rolling roller 130 may be high. Thus, the inspection unit 143 change the inspection period to be shorter than that of the finished electrode 10, which is determined as being normal through the first inspection and the second inspection. For example, the inspection unit 143 may change the inspection period of 2 weeks to 4 weeks into an inspection period of 2 days to 7 days.

The range of the inputted surface roughness value Rz of the rolling roller 130 may be 0.5 μm or less, preferably, 0.4 μm or less. That is, when the range of the inputted surface roughness value Rz of the rolling roller 130 is 0.5 μm or more, the surface roughness of the finished electrode may be significantly deteriorated to deteriorate performance. Thus, the range of the inputted surface roughness value Rz of the rolling roller 130 may be 0.5 μm or less, preferably, 0.4 μm or less to prevent the quality of the electrode from being deteriorated.

The inputted surface roughness value Rz of the electrode may be 3 μm or less, preferably, 2 μm or less. That is, when the inputted surface roughness value Rz of the electrode is 3 μm or more, there is a problem that the performance of the finished electrode is significantly deteriorated. Thus, the inputted surface roughness value Rz of the electrode may be 3 μm or less, preferably, 2 μm or less to prevent the quality of the electrode from being deteriorated.

The above-described system for manufacturing the electrode for the secondary battery according to an embodiment of the present invention may inspect the surface roughness of the rolling roller 130 and the surface roughness of the finished electrode 10 at the same time. Due to the above-described feature, the quality inspection of the electrode may be more precisely performed. Particularly, the replacement period of the rolling roller for rolling the electrode may be more accurately determined.

Hereinafter, a manufacturing method using the system for manufacturing the electrode for the secondary battery according to an embodiment of the present invention will be described.

[Method for Manufacturing Electrode for Secondary Battery According to Embodiment]

As illustrated in FIG. 4, the method for manufacturing an electrode for a secondary battery according to an embodiment of the present invention comprises a supply step (S10) of supplying a collector 11 having a long sheet shape, an electrode active material coating step (S20) of applying an electrode active material 12 to a surface of the collector 11 to manufacture an unfinished electrode 10a, an electrode manufacturing step (S30) of rolling a surface of the unfinished electrode 10a by using a rolling roller 130 and adjusting a thickness of the electrode active material 12 to manufacture a finished electrode 10, and an electrode quality inspection step (S40) of inspecting quality of the finished electrode 10 through a surface roughness value Rz of the rolling roller 130 and a surface roughness value Rz of the electrode active material 12 applied to the finished electrode 10.

In the supply step (S10), the collector 11 having the long sheet shape, which is wound around a supply roller 110, is continuously supplied to an electrode active material coating device 120.

In the electrode active material coating step (S20), the electrode active material 12 may be applied to the surface of the collector 11 supplied by the supply roller 110 through the electrode active material coating device 120 to manufacture the unfinished electrode 10a.

In the electrode manufacturing step (S30), the unfinished electrode 10a may be rolled by using the rolling roller 130 to uniformly adjust the thickness of the electrode active material 12, thereby manufacturing the finished electrode 10.

The electrode quality inspection step (S40) is performed to inspect quality of the finished electrode 10. The electrode quality inspection step (S40) comprises a first process (S41) of measuring a surface roughness value Rz of the rolling roller 130, a second process (S42) of measuring a surface roughness value Rz of the electrode active material applied to the finished electrode 10, a third process (S43) of performing first inspection to determine whether the measured surface roughness value Rz of the rolling roller 130 is within a range of the inputted surface roughness value Rz of the rolling roller, and a fourth process (S44) of performing second inspection to determine whether the measured surface roughness value Rz of the finished electrode 10 is within a range of the inputted surface roughness value Rz of the electrode.

In the first process (S41), the surface roughness of the rolling roller 130 is measured through a rolling roller measuring unit 141. That is, in the rolling roller measuring unit 141 a tip having a needle shape, which is attached to one surface, measures roughness while moving from a surface of one end to a surface of the other end of the rolling roller 130 and then calculates a mean value of a maximum mountain height and a minimum mountain height within the moving distance and thereby to calculate the surface roughness value Rz of the rolling roller 130.

In the second process (S42), the surface roughness of the electrode active material 12 applied to the finished electrode 10 is measured through an electrode measuring unit 142. That is, the electrode measuring unit 142 enlarges and photographs a surface of the finished electrode 10 and calculates a maximum mountain height and a minimum mountain height within a moving distance while moving from one end to the other end of the photographed image to calculate the surface roughness value Rz of the electrode.

In the third process (S43), the inspection unit 143 performs the first inspection to determine whether the surface roughness value Rz of the rolling roller 130, which is measured by the rolling roller measuring unit 141, is within a range of the inputted surface roughness value Rz of the rolling roller. If the surface roughness value of the rolling roller is within the range of the inputted surface roughness value of the rolling roller, then a result of the first inspection is normal and if the surface roughness value of the rolling roller is outside of the range of the inputted surface roughness value of the rolling roller, then the result of the first inspection is abnormal.

For example, the inspection unit 143 determines the measured surface roughness value Rz of the rolling roller 130 as being normal when the range of the inputted surface roughness value Rz of the rolling roller is 0.5 μm or less, preferably, 0.4 μm or less, and the surface roughness value Rz of the rolling roller, which is measured by the rolling roller measuring unit 141, is 0.4 μm. If the surface roughness value Rz of the rolling roller 130, which is measured by the rolling roller measuring unit 141, is 0.7 µm, the measured surface roughness value Rz of the rolling roller 130 is determined as being abnormal.

In the fourth process (S44), the inspection unit 143 performs the second inspection to determine whether the surface roughness value Rz of the finished electrode 10, which is measured by the electrode measuring unit 142, is within a range of the inputted surface roughness value Rz of the electrode. If the surface roughness value of the finished electrode is within the range of the inputted surface roughness value of the finished electrode, then a result of the second inspection is normal and if the surface roughness value of the finished electrode is outside of the range of the inputted surface roughness value of the finished electrode, then the result of the second inspection is abnormal.

For example, the inspection unit 143 determines the measured surface roughness value Rz of the finished electrode 10 as being normal when the range of the inputted surface roughness value Rz of the electrode is 3 µm or less, preferably, 2 µm or less, and the measured surface roughness value Rz of the finished electrode is 2 µm. If the measured surface roughness value Rz of the finished electrode 10 is 4 µm, the measured surface roughness value Rz of the finished electrode 10 is determined as being abnormal.

That is, in the electrode quality inspection step (S40), when all of the results are determined as being normal through the first and second inspection, the finished electrode 10 is determined as the normal product. Also, when one result is determined as being normal, and the other result is determined as being abnormal through the first and second inspection, the finished electrode 10 is determined as the product to be re-inspected, and when all of the results are determined as being abnormal through the first and second inspection, the finished electrode 10 is determined as the abnormal product.

Thus, in the method for manufacturing the electrode for the secondary battery according to an embodiment of the present invention, the quality of the finished electrode may be more precisely inspected.

Accordingly, the scope of the present invention is defined by the appended claims rather than the foregoing description and the exemplary embodiments described therein.

Various modifications made within the meaning of an equivalent of the claims of the invention and within the claims are to be regarded to be in the scope of the present invention.

The invention claimed is:

1. A method for manufacturing an electrode for a secondary battery, comprising:
a supply step of supplying a collector having a long sheet shape;
an electrode active material coating step of applying an electrode active material to a surface of the collector to manufacture an unfinished electrode;
an electrode manufacturing step of rolling a surface of the unfinished electrode by using a rolling roller and adjusting a thickness of the electrode active material to manufacture a finished electrode; and
an electrode quality inspection step comprising a first process of measuring a surface roughness value of the rolling roller, a second process of measuring a surface roughness value of the electrode active material applied to the finished electrode, a third process of performing first inspection to determine whether the measured surface roughness value of the rolling roller is within a range of the inputted surface roughness value of the rolling roller, and a fourth process of performing second inspection to determine whether the measured surface roughness value of the finished electrode is within a range of the inputted surface roughness value of the electrode,
wherein when the surface roughness value of the rolling roller is within the range of the inputted surface roughness value of the rolling roller, then a result of the first inspection is normal and when the surface roughness value of the rolling roller is outside of the range of the inputted surface roughness value of the rolling roller, then the result of the first inspection is abnormal, and
wherein when the surface roughness value of the finished electrode is within the range of the inputted surface roughness value of the finished electrode, then a result of the second inspection is normal and when the surface roughness value of the finished electrode is outside of the range of the inputted surface roughness value of the finished electrode, then the result of the second inspection is abnormal,
wherein the electrode quality inspection step further comprises determining the finished electrode as a normal product when the result of the first inspection and the result of the second inspection are both normal, determining the finished electrode as a product to be re-inspected when one of the results of the first and second inspections is normal and one of the results of the first and second inspections is abnormal, and determining the finished electrode as an abnormal product when the result of the first inspection and the result of the second inspection are both abnormal,
wherein in the electrode quality inspection step, when one of the results of the first and second inspections is normal and one of the results of the first and second inspections is abnormal, performing a re-inspection, wherein the re-inspection is a repeat of the inspection having the abnormal result,
wherein the electrode quality inspection step is configured to change an inspection period of 2 weeks to 4 weeks into an inspection period of 2 days to 7 days when the result of the re-inspection is normal,
wherein in the first process, the surface roughness of the rolling roller is measured through a rolling roller measuring unit, wherein the rolling roller measuring unit has a tip having a needle shape, which is attached to one surface, wherein the rolling roller measuring unit measures roughness while moving from a surface of one end to a surface of the other end of the rolling roller and then calculates a mean value of a maximum mountain height and a minimum mountain height within a moving distance and thereby calculates the surface roughness value Rz of the rolling roller,
wherein in second process, the surface roughness of the electrode active material applied to the finished electrode is measured through an electrode measuring unit, wherein the electrode measuring unit enlarges and photographs a surface of the finished electrode and calculates a maximum mountain height and a minimum mountain height within a moving distance while moving from one end to the other end of the photographed image to calculate the surface roughness value Rz of the electrode.

2. The method of claim 1, further comprising performing the electrode quality inspection step at intervals of 2 weeks to 4 weeks.

3. The method of claim 1, further comprising stopping operation of the rolling roller when a result of the re-inspection is abnormal.

\* \* \* \* \*